3,453,119
STORAGE OF FRESH LEAFY VEGETABLES
John N. McGill, St. Joseph, Mich., assignor to Whirlpool Corporation, a corporation of Delaware
No Drawing. Filed Mar. 29, 1965, Ser. No. 443,698
Int. Cl. A23b 7/14
U.S. Cl. 99—154
2 Claims

ABSTRACT OF THE DISCLOSURE

A method of storing fresh leafy vegetables in which the vegetables are maintained in an atmosphere of high carbon monoxide and low oxygen content so as to permit the vegetables to respire at a low rate. During the storage the vegetables are kept at a low but non-freezing temperature and under high humidity conditions.

---

This invention relates to a method of storing harvested fresh leafy vegetables that are subject to deterioration changes on storage including respiratory deterioration changes, bacterial deterioration changes and other enzymatic deterioration changes.

The different types fresh leafy and head vegetables, of which lettuce and cauliflower are examples, are subject to various types of deterioration in storage. This is true even though the storage is ordinarily not excessive but is usually during travel time of moving the vegetables from the place of harvesting to the place of consumption. The deterioration can be material. This deterioration which is primarily respiratory, bacterial and enzymatic results in considerable loss.

The method of this invention greatly retards this deterioration with the result that the butt end of the harvested vegetable is kept fresh in appearance, of which an example is the retarding of the darkening of the lettuce butt end, retards the internal "pinking" of leaves, and particularly of lettuce, retards russet spotting of the leaves which may be caused primarily by unsaturated gases such as ethylene, retards production of slime which is caused primarily by bacteria, reduces the amount of the vegetable that must be discarded while on display for sale, and reduces the amount of the vegetable that must be discarded by the housewife at the time of consumption.

One of the features of this invention therefore is to provide an improved method of storing harvested fresh leafy vegetables so that they maintain their fresh appearance and other values even over extended periods of time.

Other features and advantages of the invention will be apparent from the following description thereof taken in conjunction with certain embodiments.

In the prior patent of Bedrosian et al. No. 3,102,777, assigned to the same assignee as the present application, there is disclosed and claimed a method of preserving animal and plant materials by controlling the atmosphere in which the materials are stored. Stored harvested animal and plant materials respirate according to the following approximate respiratory change equation which is described in the above Bedrosian patent:

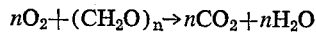

$$nO_2 + (CH_2O)_n \rightarrow nCO_2 + nH_2O$$

This equation expresses the chemical reactions involved on respiration in a simplified manner. The $(CH_2O)_n$ represents a carbohydrate molecule of the material that is destroyed during the degradation or deterioration process during storage by consuming oxygen and giving off carbon dioxide and water. As was pointed out in the patent, this degradation equation can be slowed considerably so that materials can be stored for much longer periods of time by decreasing the amount of oxygen from that found in normal air. This reduces the progress of the equation in the direction indicated so that destruction of the molecules of the stored materials is very greatly reduced, thereby increasing considerably the storage period.

It has been found that fresh leafy vegetables of which lettuce is an excellent example present certain specialized storage problems. Because this storage period can be as much as two weeks or more because the main growing areas are in the Far West and Southwest while the principal consuming areas are in the East, the deterioration during transporation and storage presents a considerable problem and a considerable loss.

It has been discovered that by providing the proper storage atmosphere and storage conditions the deterioration of fresh leafy vegetables is very greatly retarded so that even after two weeks the vegetables have the appearance and other values of vegetables that have been but recently harvested. Thus, the method of this invention retards the darkening of the butt end of the harvested vegetables and retards the internal "pinking," russet spotting and production of slime, with the result that the stored vegetables are not only of fresh appearance and other values, but also reduces considerably the waste, as much less of the vegetables must be discarded before being displayed for sale.

The harvested fresh leafy vegetables are subjected to an atmosphere containing oxygen and carbon monoxide. The amount of oxygen is less than that found in normal air, which ordinarily is about 21% oxygen and 0.03% carbon dioxide, with the remainder being nitrogen and minor amounts of other inert gases. The amount of carbon monoxide is regulated to an effective amount for retarding bacterial and enzymatic deterioration changes. While the stored vegetables are subjected to the atmosphere they are also maintained at a non-freezing temperature of about 32–40° F. and a relative humidity of about 90–100%. To generate the low oxygen and carbon monoxide containing atmosphere an ordinary carbonaceous fuel burner of the type disclosed in Brody et al. Patent 3,102,779 or a catalytic burner of the type disclosed in Bedrosian et al. Patent 3,102,778 may be employed, both patents assigned to the same assignee as the present application. It is necessary to control the burning conditions so that the low oxygen and carbon monoxide containing atmosphere is produced. If desired, the carbon monoxide may be added by other means.

The amount of oxygen in the atmosphere is effective to retard but not prevent respiration according to the above equation, while the amount of carbon monoxide is an effective amount for retarding the bacterial and enzymatic deterioration changes. It is preferred that these effective amounts for oxygen and carbon monoxide be at least about 1%.

Typical examples of the amount of carbon monoxide in the atmosphere is about 1–5% by volume. Similarly, typical examples of the amount of oxygen is about 1–10% by volume, it being understood that the higher the amount of oxygen the faster the rate of respiration and the greater the deterioration changes that will take place.

Although carbon dioxide in the atmosphere is not required for efficient storage, some may be provided and is useful in retarding enzymatic and bacterial degradation. However, a relatively high amount of carbon dioxide in the atmosphere tends to cause spotting in the leaves. Thus, in the case of lettuce, a carbon dioxide content substantially above about 5% by volume causes a red spotting on the main ribs of the lettuce leaves. This can, at times, be seen in storage. When the lettuce is taken out of storage and re-exposed to air, the red spot becomes more pronounced and the tissue at the red spot dies and spreads over the rib of the leaf and the leaf itself. Therefore, the amount of carbon dioxide in the atmosphere including that given off by respiration as indicated in the above respiration equation is preferably limited to a maximum of about 5% by volume. This limiting of the amount of carbon dioxide is very easily accomplished by exposing the atmosphere to various types of carbon dioxide scrubbers in the customary manner. This is a well-known and very old expedient for removing carbon dioxide from the atmosphere.

The amount of oxygen in the atmosphere must not be excessively low in order that the continuing respiration of the stored vegetables will not be stopped and the vegetable become anaerobic. The oxygen level cannot be too high, however, as respiration will be excessively rapid with resulting excessive deterioration. The amount of oxygen therefore must be less than the normal air quantity and in an effective amount for retarding but not preventing the progress of the respiration equation. This amount of oxygen should be a minimum of about 1%.

As stated above, the amount of carbon monoxide in the atmosphere is an effective amount for retarding bacterial and enzymatic deterioration changes and is a minimum of about 1%. Although a practical limit is about 1–5% by volume, a preferred limit is about 1–2% by volume.

The carbon monoxide is not only a more effective enzyme and bacteria inhibitor than is carbon dioxide, but it also functions as a reducing agent to maintain the fresh appearance of the severed butt end of the vegetables. Thus, with lettuce the carbon monoxide retards the darkening of the severed lettuce butt end.

The remainder of the atmosphere can be nitrogen or other inert gas or gases such as the nitrogen and inert gases from air.

The temperature to which the stored vegetables are subjected can be as low as 32° F. so long as they are not frozen. A practical upper limit has been found to be about 40° F. which is due primarily to the operational characteristics of commercial refrigerated transportation equipment. It is preferred that the temperature be maintained as low as possible without freezing.

The relative humidity of the storage atmosphere is preferably about 90–100%.

The method of this invention is of great value to growers and shippers of fresh leafy vegetables. This is true because ordinary shipping time from the growing areas to the large consuming areas is about 9–14 days. Ordinarily, an additional 6–8 days is required before the vegetables are ready for consumption by the consuming public. In an attempt to maintain the vegetables in a fresh condition various cooling means have been used. Thus, it is customary to place the harvested vegetables in a vacuum cooling chamber and there cooled as rapidly as possible to the desired temperature. The cooled vegetables are then placed in a refrigerated shipping unit such as a truck trailer or a railroad car and shipped to the point of sale and consumption. In spite of this, however, losses during shipping have been considerable. The method of this invention greatly reduces these losses so that the leafy vegetables may be stored, as during shipment, for as much as 14 days without substantial loss in appearance and other values or amount of the vegetables and they may be stored for even longer periods with less of the vegetables trimmed before sale.

An example of practicing the method of this invention is the storage of lettuce in an atmosphere for 10 days containing 1.5% by volume of carbon monoxide, 2% by volume of oxygen and 1% by volume of carbon dioxide. The atmosphere was maintained at a temperature of about 38° F. and a relative humidity of about 90%.

In another example, the same storage conditions were maintained except at the beginning of storage the carbon dioxide level was raised to about 10–12% by volume for about 6 hours and then the carbon dioxide level was reduced to about 2%.

Having described my invention as related to the embodiments set out herein, it is my intention that the invention be not limited by any of the details of description, unless otherwise specified, but rather be construed broadly within its spirit and scope as set out in the accompanying claims.

The embodiments of the invention in which an exclusive property or privilege is claimed are defined as follows:

1. The method of storing harvested fresh leafy vegetables subject to deterioration changes including respiratory deterioration changes on storage in air containing normal quantities of oxygen wherein oxygen is consumed and carbon dioxide is produced according to the following respiratory change equation:

$$nO_2 + (CH_2O)_n \rightarrow nCO_2 + nH_2O$$

wherein $(CH_2O)_n$ represents a carbohydrate molecule from said vegetables, bacterial deterioration changes and enzymatic deterioration changes, comprising: subjecting said vegetables to an atmosphere containing oxygen and carbon monoxide, the amount of oxygen being less than said normal air quantity and in an effective amount of at least about 1% for retarding but not preventing the progress of said equation and the amount of carbon monoxide being an effective amount of at least about 1% for retarding said bacterial and enzymatic deterioration changes, while subjecting said vegetables to a nonfreezing temperature and a relative humidity, both effective for preserving said vegetables during said storing; and limiting the amount of carbon dioxide in said atmosphere including that generated according to the above equation to a maximum of about 5% by volume.

2. The method of claim 1 wherein the amount of carbon monoxide is about 1–5% by volume and the amount of oxygen is about 1–10% by volume.

References Cited

UNITED STATES PATENTS 2,955,940  10/1960  Williams _____ 99—189 X
3,102,777   9/1963  Bedrosian _____ 99—154 X A. LOUIS MONACELL, *Primary Examiner.*

J. M. HUNTER, *Assistant Examiner.*